United States Patent
Mochizuki et al.

(10) Patent No.: US 8,662,652 B2
(45) Date of Patent: Mar. 4, 2014

(54) INK COMPOSITION, INKJET RECORDING METHOD, AND PRINTED MATERIAL

(75) Inventors: Kyohei Mochizuki, Ashigarakami-gun (JP); Yuusuke Fujii, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 13/338,674

(22) Filed: Dec. 28, 2011

(65) Prior Publication Data

US 2012/0162308 A1 Jun. 28, 2012

(30) Foreign Application Priority Data

Dec. 28, 2010 (JP) .................................. 2010-292302

(51) Int. Cl.
*B41J 2/01* (2006.01)
(52) U.S. Cl.
USPC .......................................................... 347/100
(58) Field of Classification Search
USPC ........................................ 347/100; 106/31.13
See application file for complete search history.

(56) References Cited

U.S. PATENT DOCUMENTS

| | | | | |
|---|---|---|---|---|
| 2007/0043145 A1* | 2/2007 | Beck et al. | ..................... | 523/160 |
| 2008/0081119 A1* | 4/2008 | Oyanagi et al. | ............ | 427/385.5 |
| 2008/0225099 A1 | 9/2008 | Cohen et al. | | |
| 2008/0287563 A1* | 11/2008 | Lee et al. | ........................ | 522/75 |

FOREIGN PATENT DOCUMENTS

| | | | |
|---|---|---|---|
| EP | 2 216 377 A1 | 8/2010 | |
| EP | 2 412 765 A1 | 2/2012 | |
| EP | 2 415 607 A1 | 2/2012 | |
| JP | 2004-182930 A | 7/2004 | |
| JP | 2004-536925 A | 12/2004 | |
| JP | 2006-193744 A | 7/2006 | |
| JP | 2007-182535 A | 7/2007 | |
| JP | 2007-231082 A | 9/2007 | |
| JP | 2008-095070 A | 4/2008 | |
| JP | 2010-024277 A | 2/2010 | |
| JP | 2010-180376 A | 8/2010 | |
| JP | 2010-229283 A | 10/2010 | |
| JP | 2010-235914 A | 10/2010 | |
| WO | WO 03/010249 A1 | 2/2003 | |

OTHER PUBLICATIONS

European Search Report dated Mar. 16, 2012.
Japanese Office Action dated Oct. 30, 2012, issued in corresponding Japanese Application.

* cited by examiner

*Primary Examiner* — Laura Martin
(74) *Attorney, Agent, or Firm* — Sughrue Mion, PLLC

(57) ABSTRACT

An ink composition is provided that includes (Component A) at least one compound selected from the group consisting of bis(2,4,6-trimethylbenzoyl)phenylphosphine oxide and 2,4,6-trimethylbenzoyldiphenylphosphine oxide, (Component B) at least one compound selected from the group consisting of 2-methyl-1-(4-methylthiophenyl)-2-morpholinopropan-1-one, 2-(dimethylamino)-2-[(4-methylphenyl)methyl]-1-[4-(4-morpholinyl)phenyl]-1-butanone, and 2-benzyl-2-dimethylamino-1-(4-morpholinophenyl)-1-butanone, (Component C) a thioxanthone compound, (Component D) a polymerization inhibitor, and (Component E) a polymerizable compound, Component C having a content of 0.01 to 5 wt % relative to the total weight of the ink composition, Component D having a content of 0.01 to 5 wt % relative to the total weight of the ink composition, the sum of the content of Component A and the content of Component B being 6.0 to 9.5 wt % relative to the total weight of the ink composition, and the ratio by weight ((A)/(B)) of the content (A) of Component A and the content (B) of Component B being 0.8 to 2.0.

20 Claims, No Drawings

INK COMPOSITION, INKJET RECORDING METHOD, AND PRINTED MATERIAL

BACKGROUND OF THE INVENTION

1. Field of the Invention

The present invention relates to an ink composition, an inkjet recording method, and a printed material.

2. Description of the Related Art

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays. Examples of a conventional ink composition for inkjet recording are described in Published Japanese translation of PCT application No. 2004-536925, Published Japanese translation of PCT application No. 2004-536925, JP-A-2004-182930 (JP-A denotes a Japanese unexamined patent application publication), JP-A-2006-193744, JP-A-2010-180376, and JP-A-2010-229283.

DISCLOSURE OF INVENTION

Problems to be Solved by the Invention

It is an object of the present invention to provide an ink composition that has excellent surface curability, antiblocking properties, and storage stability and that can give a cured film having excellent adhesion to a polyvinyl chloride substrate and an image having high image quality, and an inkjet recording method and printed material using the ink composition.

Means for Solving the Problems

The object of the present invention has been accomplished by means described in <1>, <9>, and <11>. They are described together with <2> to <8> and <10>, which are preferred embodiments.

<1> An ink composition comprising (Component A) at least one compound selected from the group consisting of (Component A1) bis(2,4,6-trimethylbenzoyl)phenylphosphine oxide and (Component A2) 2,4,6-trimethylbenzoyldiphenylphosphine oxide, (Component B) at least one compound selected from the group consisting of (Component B1) 2-methyl-1-(4-methylthiophenyl)-2-morpholinopropan-1-one, (Component B2) 2-(dimethylamino)-2-[(4-methylphenyl)methyl]-1-[4-(4-morpholinyl)phenyl]-1-butanone, and (Component B3) 2-benzyl-2-dimethylamino-1-(4-morpholinophenyl)-1-butanone, (Component C) a thioxanthone compound, (Component D) a polymerization inhibitor, and (Component E) a polymerizable compound, Component C having a content of 0.01 to 5 wt % relative to the total weight of the ink composition, Component D having a content of 0.01 to 5 wt % relative to the total weight of the ink composition, the sum of the content of Component A and the content of Component B being 6.0 to 9.5 wt % relative to the total weight of the ink composition, and the ratio by weight ((A)/(B)) of the content (A) of Component A and the content (B) of Component B being 0.8 to 2.0, <2> the ink composition according to <1> above, wherein it is a UV-curable inkjet ink composition, <3> the ink composition according to <1> or <2> above, wherein Component C is diethylthioxanthone or 2-isopropylthioxanthone, <4> the ink composition according to any one of <1> to <3> above, wherein Component E comprises N-vinylcaprolactam, <5> the ink composition according to any one of <1> to <4> above, wherein it further comprises (Component F) a colorant, <6> the ink composition according to <5> above, wherein Component F is a pigment, <7> the ink composition according to any one of <1> to <6> above, wherein Component A is Component A1, <8> the ink composition according to any one of <1> to <7> above, wherein Component B is Component B1, <9> an inkjet recording method comprising a step of discharging the ink composition according to any one of <1> to <8> above onto a recording medium, and a step of curing the ink composition by irradiating the discharged ink composition with actinic radiation using a UV light-emitting diode, <10> the inkjet recording method according to <9> above, wherein the UV light-emitting diode has an emission peak wavelength in the range of 350 to 420 nm and has a maximum illumination intensity on the recording medium surface of 10 to 2,000 mW/cm$^2$, and <11> a printed material recorded by the inkjet recording method according to <9> or <10> above.

MODE FOR CARRYING OUT THE INVENTION

Ink Composition

The ink composition of the present invention comprises (Component A) at least one compound selected from the group consisting of (Component A1) bis(2,4,6-trimethylbenzoyl)phenylphosphine oxide and (Component A2) 2,4,6-trimethylbenzoyldiphenylphosphine oxide, (Component B) at least one compound selected from the group consisting of (Component B1) 2-methyl-1-(4-methylthiophenyl)-2-morpholinopropan-1-one, (Component B2) 2-(dimethylamino)-2-[(4-methylphenyl)methyl]-1-[4-(4-morpholinyl)phenyl]-1-butanone, and (Component B3) 2-benzyl-2-dimethylamino-1-(4-morpholinophenyl)-1-butanone, (Component C) a thioxanthone compound, (Component D) a polymerization inhibitor, and (Component E) a polymerizable compound, Component C having a content of 0.01 to 5 wt % relative to the total weight of the ink composition, Component D having a content of 0.01 to 5 wt % relative to the total weight of the ink composition, the sum of the content of Component A and the content of Component B being 6.0 to 9.5 wt % relative to the total weight of the ink composition, and the ratio by weight ((A)/(B)) of the content (A) of Component A and the content (B) of Component B being 0.8 to 2.0.

In the present specification the notation 'A to B', which expresses a numerical range, has the same meaning as 'at least A but no greater than B'. '(Component A) at least one compound selected from the group consisting of (Component A1) bis(2,4,6-trimethylbenzoyl)phenylphosphine oxide and (Component A2) 2,4,6-trimethylbenzoyldiphenylphosphine oxide', etc. is also expressed simply as 'Component A', etc. Furthermore, '(meth)acrylate' is sometimes used to indicate either of, or both, 'acrylate' and 'methacrylate'.

In the present invention, the ink composition is an oil-based ink composition that is curable upon exposure to actinic radiation. The 'radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition of the present invention is therefore preferably an ink composition that can cure upon exposure to ultraviolet rays as radiation.

In particular, in the present invention, the ink composition is preferably one that cures, using a light-emitting diode that emits UV having an emission peak wavelength in the range of 380 to 420 nm, with high sensitivity toward UV having a maximum illumination intensity of 10 to 2,000 mW/cm$^2$ on the recording medium surface onto which the ink composition has been discharged.

Furthermore, in the present invention, since the ink composition is a radiation curing type ink composition and is cured after the ink composition is applied onto a recording medium, it is preferable for it not to contain a highly volatile solvent and for it to be free from solvent. This is because, if a highly volatile solvent remains in a cured ink image, the solvent resistance is degraded and the VOC (Volatile Organic Compound) problem of residual solvent occurs, which should be suppressed.

(Component A) At Least One Compound Selected from Group Consisting of Component A1 and Component A2

The ink composition of the present invention comprises at least one compound selected from the group consisting of (Component A1) bis(2,4,6-trimethylbenzoyl)phenylphosphine oxide and (Component A2) 2,4,6-trimethylbenzoyldiphenylphosphine oxide.

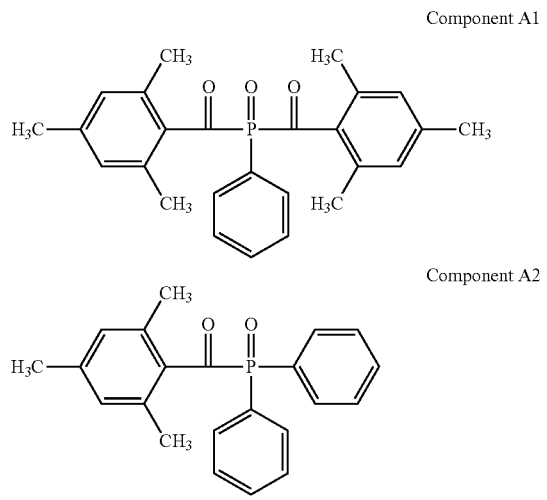

The ink composition of the present invention may comprise, as Component A, Component A1 or Component A2 or Component A1 and Component A2, but from the viewpoint of surface curability and antiblocking properties Component A is preferably Component A1.

Examples of Component A that are commercially available include IRGACURE 819 (Component A1, Ciba Specialty Chemicals) and LUCIRIN TPO (Component A2, BASF).

In the ink composition of the present invention the sum of the content of Component A and the content of Component B, which is described later, is 6.0 to 9.5 wt % relative to the total weight of the ink composition, preferably 6.0 to 9.0 wt %, and more preferably 6.0 to 8.0 wt %. When in the above-mentioned range, the surface curability and the antiblocking properties are excellent.

Furthermore, in the ink composition of the present invention the ratio by weight ((A)/(B)) of the content (A) of Component A and the content (B) of Component B, which is described later, is 0.8 to 2.0, preferably 1.0 to 2.0, more preferably 1.1 to 1.9, and yet more preferably 1.2 to 1.8. When in the above-mentioned range, the surface curability and the antiblocking properties are excellent.

Moreover, the content of Component A in the ink composition of the present invention is preferably 3.0 to 6.5 wt % relative to the total weight of the ink composition, more preferably 3.0 to 5.0 wt %, and yet more preferably 3.0 to 4.0 wt %.

(Component B) At Least One Compound Selected from Group Consisting of Component B1, Component B2, and Component B3

The ink composition of the present invention comprises at least one compound selected from the group consisting of (Component B1) 2-methyl-1-(4-methylthiophenyl)-2-morpholinopropan-1-one, (Component B2) 2-(dimethylamino)-2-[(4-methylphenyl)methyl]-1-[4-(4-morpholinyl)phenyl]-1-butanone, and (Component B3) 2-benzyl-2-dimethylamino-1-(4-morpholinophenyl)-1-butanone.

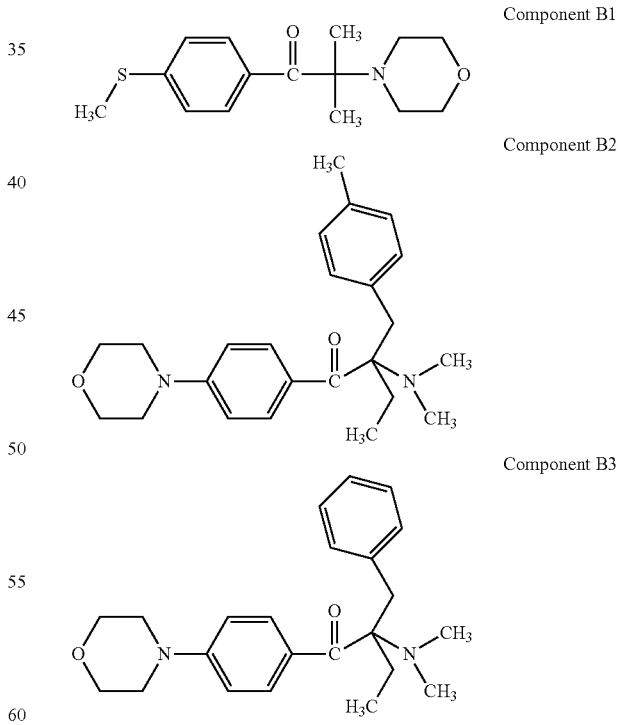

The ink composition of the present invention may comprise, as Component B, any one type of Component B1 to Component B3 on its own or two or three types of Component B1 to Component B3, but from the viewpoint of surface curability and antiblocking properties Component B is preferably Component B1.

Examples of Component B that are commercially available include IRGACURE 907 (Component B1, Ciba Specialty Chemicals), IRGACURE 379 (Component B2, Ciba Specialty Chemicals), and IRGACURE 369 (Component B3, Ciba Specialty Chemicals).

Furthermore, the content of Component B in the ink composition of the present invention is preferably 2.0 to 4.0 wt % relative to the total weight of the ink composition, more preferably 2.0 to 3.5 wt %, and yet more preferably 2.0 to 3.0 wt %.

(Component C) Thioxanthone Compound

The ink composition of the present invention comprises (Component C) a thioxanthone compound, and Component C has a content of 0.01 to 5 wt % relative to the total weight of the ink composition. When in the above-mentioned range, the interior and surface curability and substrate adhesion are excellent.

The thioxanthone compound is not particularly limited; a known compound may be used, and a compound represented by Formula (c-1) below is preferable.

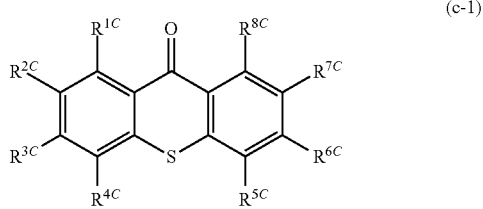

In Formula (c-1) above, $R^{1C}$, $R^{2C}$, $R^{3C}$, $R^{4C}$, $R^{5C}$, $R^{6C}$, $R^{7C}$, and $R^{8C}$ independently denote a hydrogen atom, an alkyl group, a halogen atom, a hydroxy group, a cyano group, a nitro group, an amino group, an alkylthio group, an alkylamino group (The alkylamino group includes the case of monoalkylsubstituted amino group and dialkylsubstituted amino group. It is same also in the following), an alkoxy group, an alkoxycarbonyl group, an acyloxy group, an acyl group, a carboxy group, or a sulfo group. The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1C}$, $R^{2C}$, $R^{3C}$, $R^{4C}$, $R^{5C}$, $R^{6C}$, $R^{7C}$, and $R^{8C}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a fused ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboxylmide, N-(1,1,3,3-tetramethylbutyl)thioxanthone-3,4-dicarboxylmide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride.

Among them, from the viewpoint of the surface curability, adhesion, image quality, and antiblocking properties, diethylthioxanthone or isopropylthioxanthone are preferable, diethylthioxanthone or 2-isopropylthioxanthone are more preferable, diethylthioxanthone are yet more preferable, and 2,4-diethylthioxanthone are particularly preferable.

With regard to Component C, one type thereof may be used on its own or two or more types may be used in combination.

The content of Component C in the ink composition of the present invention is 0.01 to 5 wt % relative to the total weight of the ink composition, preferably 0.1 to 5 wt %, more preferably 1.0 to 4.0 wt %, and yet more preferably 2.0 to 3.0 wt %. When in the above-mentioned range, the surface curability, adhesion, image quality, and antiblocking properties are excellent.

(Component D) Polymerization Inhibitor

The ink composition of the present invention comprises (Component D) a polymerization inhibitor, and the content of Component D is 0.01 to 5 wt % relative to the total weight of the ink composition.

As Component D, a known polymerization inhibitor may be used, and examples thereof include a phenol, a quinone, a nitro compound, a nitroso compound, an amine, and a sulfide. Specific examples thereof include radical polymerization inhibitors including phenols such as hydroquinone, hydroquinone monomethyl ether, mono-tert-butylhydroquinone, catechol, p-tert-butylcatechol, p-methoxyphenol, p-tert-butylcatechol, 2,6-di-tert-butyl-m-cresol, pyrogallol, β-naphthol, and 4-methoxy-1-naphthol; quinones such as benzoquinone, 2,5-diphenyl-p-benzoquinone, p-toluquinone, and p-xyloquinone; nitro compounds and nitroso compounds such as nitrobenzene, m-dinitrobenzene, 2-methyl-2-nitrosopropane, α-phenyl-tert-butylnitrone, 5,5-dimethyl-1-pyrroline-1-oxide, and tris(N-nitroso-N-phenylhydroxylamine) aluminum; amines such as chloranil amine, diphenylamine, diphenylpicrylhydrazine, phenol-α-naphthylamine, pyridine, and phenothiazine; and sulfides such as dithiobenzoyl sulfide and dibenzyl tetrasulfide. Examples also include hindered amine compounds, which are described above.

With regard to Component D, one type thereof may be used on its own or two or more types may be used in combination.

The content of Component D in the ink composition of the present invention is 0.01 to 5 wt % relative to the total weight of the ink composition, preferably 0.01 to 1 wt %, more preferably 0.01 to 0.5 wt %, and yet more preferably 0.05 to 0.1 wt %. When in the above-mentioned range, the surface curability, adhesion, image quality, and antiblocking properties are excellent.

(Component E) a Polymerizable Compound

The ink composition of the present invention comprises (Component E) a polymerizable compound.

The polymerizable compound is preferably an ethylenically unsaturated compound, and is preferably a radically polymerizable compound.

The radically polymerizable compound may be any compound as long as it has one radically polymerizable ethylenically unsaturated bond in the molecule, and include chemical configurations such as monomer, oligomer, and polymer.

The radically polymerizable compound may be used singly or may be used in a combination of two or more types at any ratio in order to improve desired properties.

From the viewpoint of curability and adhesion, it is preferable for Component E to comprise at least (Component E1) an N-vinyllactam.

From the viewpoint of adhesion, the content of the N-vinyllactam (Component E1) in the ink composition of the present invention is preferably at least 10 wt % relative to the total weight of the ink composition.

Furthermore, from the viewpoint of curability, it is preferable for Component E to comprise at least (Component E2) an aromatic hydrocarbon group-containing monofunctional (meth)acrylate compound.

Moreover, from the viewpoint of curability and adhesion, it is preferable for Component E to comprise at least (Component E3) a compound represented by Formula (e-3), which is described later.

(Component E1) an N-vinyllactam

The ink composition of the present invention preferably comprises at least (Component E1) an N-vinyllactam from the viewpoint of curability.

(Component E1) an N-vinyllactam preferably comprises a compound represented by Formula (e-1).

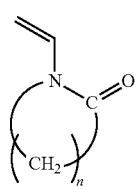

(e-1)

In Formula (e-1), n denotes an integer of 2 to 6; n is preferably an integer of 3 to 6 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

Other than the compound represented by Formula (e-1), the N-vinyllactam may have a substituent such as an alkyl group or an aryl group on the lactam ring, and may have a saturated or unsaturated ring structure bonded to the lactam ring.

A compound represented by Formula (e-1) may be used singly or in a combination of two or more compounds.

(Component E2) An Aromatic Hydrocarbon Group-Containing Monofunctional (Meth)Acrylate Compound The ink composition of the present invention preferably comprises (Component E2) an aromatic hydrocarbon group-containing monofunctional (meth)acrylate compound.

As Component E2, one having a molecular weight of no greater than 500 is preferable, and one having a molecular weight of no greater than 300 is more preferable.

Examples of Component E2 include aromatic monofunctional radically polymerizable monomers described in paragraphs 0048 to 0063 of JP-A-2009-96985. In the present invention, as the aromatic hydrocarbon group-containing monofunctional (meth)acrylate compound, a compound represented by Formula (e-2) is preferable.

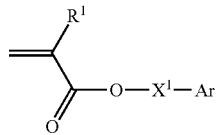

(e-2)

(In Formula (e-2), $R^1$ denotes a hydrogen atom or a methyl group, $X^1$ denotes a divalent linking group, and Ar denotes a monovalent aromatic hydrocarbon group.)

In Formula (e-2), $R^1$ is preferably a hydrogen atom.

$X^1$ denotes a divalent linking group and is preferably an ether bond (—O—), an ester bond (—C(O)O— or —OC (O)—), an amide bond (—C(O)NR'— or —NR'C(O)—), a carbonyl group (—C(O)—), an imino group (—NR'—), an optionally substituted alkylene group having 1 to 15 carbons, or a divalent group formed by combining two or more of the above. R' denotes a hydrogen atom, a straight-chain, branched, or cyclic alkyl group having 1 to 20 carbons, or an aryl group having 6 to 20 carbons. Examples of the substituent include a hydroxy group and a halogen atom.

A portion including $R^1$ and $X^1$ ($H_2C=C(R^1)$—C(O)O—$X^1$—) may be bonded to any position on the aromatic hydrocarbon structure. Furthermore, from the viewpoint of improving affinity with a colorant, the terminal of $X^1$ that is bonded to the aromatic hydrocarbon group is preferably an oxygen atom, and more preferably an ethereal oxygen atom. $X^1$ in Formula (e-2) is preferably *-$(LO)_q$—. Here, * denotes the position via which it is bonded to the carboxylic acid ester bond of Formula (e-2), q is an integer of 0 to 10, and L denotes an alkylene group having 2 to 4 carbons. q is preferably an integer of 0 to 4, more preferably an integer of 0 to 2, and yet more preferably 1 or 2. $(LO)_q$ is preferably an ethylene oxide chain or a propylene oxide chain.

Ar denotes a monovalent aromatic hydrocarbon group.

As the monovalent aromatic hydrocarbon group, a monovalent monocyclic or polycyclic aromatic hydrocarbon group having 1 to 4 rings can be cited, and specific examples thereof include groups formed by removing one hydrogen atom from benzene, naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, pleiadene, etc.

Among them, in the present invention, a phenyl group or a naphthyl group is preferable, and a monocyclic aromatic hydrocarbon group, that is, a phenyl group, is more preferable.

The monovalent aromatic hydrocarbon group optionally has a substituent on an aromatic ring.

As the substituent, a halogen atom, a carboxy group, an acyl group having 1 to 10 carbons, a hydroxy group, a substituted or unsubstituted amino group, a thiol group, or a siloxane group, or an optionally substituted hydrocarbon group or heterocyclic group having no greater than 30 carbons in total is preferable.

The substituent may further have a substituent, and examples thereof include a hydroxy group, an alkyl group having 1 to 10 carbons, and an aryl group having 6 to 12 carbons.

When the monovalent aromatic hydrocarbon group has a plurality of substituents, the substituents may be identical to or different from each other.

Furthermore, the monovalent aromatic hydrocarbon group preferably does not have a substituent on the aromatic ring.

In the present invention, a compound represented by Formula (e-2) is preferably a compound having a phenyl group, more preferably 2-phenoxyethyl (meth)acrylate, benzyl (meth)acrylate, or 2-hydroxy-3-phenoxypropyl acrylate, yet more preferably 2-phenoxyethyl (meth)acrylate, and particularly preferably 2-phenoxyethyl acrylate.

From the viewpoint of inkjet discharge properties, flexibility, and adhesion, the content of Component E2 is preferably 1 to 60 wt % relative to the weight of the entire ink composition, more preferably 10 to 50 wt %, yet more preferably 20 to 45 wt %, and particularly preferably 30 to 40 wt %.

(Component E3) A Compound Represented by Formula (e-3)

The ink composition of the present invention comprises (Component E3) a compound represented by Formula (e-3).

Due to the ink composition of the present invention comprising (Component E3) a compound represented by Formula (e-3), recording medium (especially polyvinyl chloride, polyethylene terephthalate (PET) or an acrylic resin) having excellent adhesion toward an image.

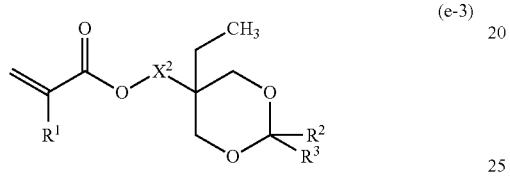

(e-3)

(In Formula (e-3), $R^1$, $R^2$, and $R^3$ independently denote a hydrogen atom, a methyl group, or an ethyl group, and $X^2$ denotes a single bond or a divalent linking group.)

$R^1$ is preferably a hydrogen atom or a methyl group, and is more preferably a hydrogen atom.

$R^2$ and $R^3$ are independently preferably a hydrogen atom, a methyl group, or an ethyl group, and both of $R^2$ and $R^3$ are more preferably hydrogen atoms.

The divalent linking group denoted by $X^2$ is not particularly limited as long as the effects of the present invention are not greatly impaired; it is preferably a divalent hydrocarbon group or a divalent group in which a hydrocarbon group and an ether bond are combined, and is more preferably a divalent hydrocarbon group, a poly(alkyleneoxy) group, or a poly(alkyleneoxy)alkyl group. Furthermore, the number of carbons of the divalent linking group is preferably 1 to 60, and more preferably 1 to 20.

$X^2$ is preferably a single bond, a divalent hydrocarbon group, or a divalent group in which a hydrocarbon group and an ether bond are combined, more preferably a divalent hydrocarbon group having 1 to 20 carbons, yet more preferably a divalent hydrocarbon group having 1 to 8 carbons, and particularly preferably a methylene group.

Specific examples of Component E3 are shown below, but are not limited to. In the examples below, R denotes hydrogen atom or methyl group.

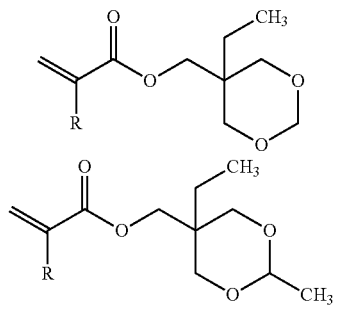

-continued

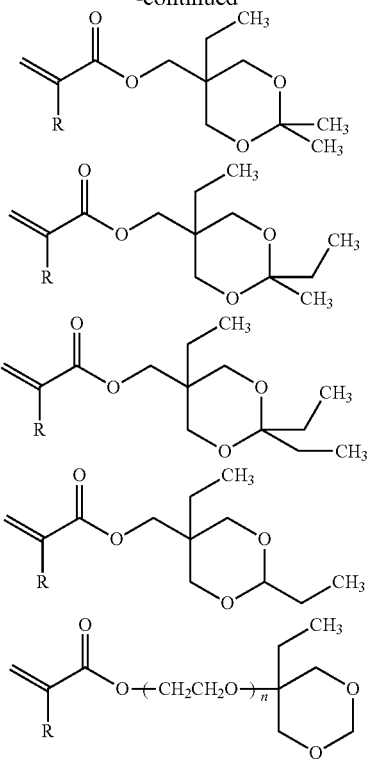

$n = 1$ to 30

Among them, cyclic trimethylolpropane formal (meth)acrylate is preferable, and cyclic trimethylolpropane formal acrylate is particularly preferable.

Component E3 may be a commercial product. The example of the commercial product is SR531 (manufactured by SARTOMER).

From the viewpoint of adhesion of recording medium and a image, and the surface curability of ink composition, the total content of Component E3 is preferably 0.5 to 50 wt % relative to the total weight of the ink composition, more preferably 1 to 30 wt %, yet more preferably 3 to 20 wt %, and particularly preferably 5 to 15 wt %.

<Other Monofunctional (Meth)Acrylate Compound>

In the present invention, an ink composition may comprise other monofunctional (meth)acrylate compound other than Component E1 to Component E3 or polyfunctional (meth)acrylate compound. Specific examples of the monofunctional (meth)acrylate compound other than Component E1 to Component E3 compound include isoamyl (meth)acrylate, stearyl (meth)acrylate, lauryl (meth)acrylate, octyl (meth)acrylate, isooctyl (meth)acrylate, decyl (meth)acrylate, isomyristyl (meth)acrylate, isostearyl (meth)acrylate, 2-ethylhexyl diglycol (meth)acrylate, 2-hydroxybutyl (meth)acrylate, buthoxyethyl (meth)acrylate, methoxydiethylene glycol (meth)acrylate, methoxypolyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-(meth)acryloyloxyethylsuccinic acid, 2-(meth)acryloyloxyethyl-2-hydroxyethylphthalic acid, a lactone-modified flexible (meth)acrylate, t-butylcyclohexyl (meth)acrylate, 2-(2-ethoxyethoxy)ethyl (meth)acrylate, cyclopentenyl (meth)acrylate, cyclopentenyloxyethyl (meth)acrylate, and dicyclopentanyl (meth)acrylate, etc.

In the present invention, the total content of a monofunctional polymerizable compound comprising Component E1 to E3 is preferably more than 40 wt % relative to the weight of the entire ink composition, more preferably 45 to 90 wt %, yet more preferably 50 to 90 wt %, and particularly preferably 60 to 85 wt %.

<Polyfunctional (Meth)Acrylate Compound>

From the viewpoint of curability of ink composition, an ink composition of the present invention preferably comprises also a polyfunctional (meth)acrylate compound as a polymerizable compound.

Specific examples of the polyfunctional (meth)acrylate include bis(4-acryloxypolyethoxyphenyl)propane, neopentyl glycol di(meth)acrylate, ethoxylated (2) neopentyl glycol di(meth)acrylate (a compound formed by di(meth)acrylating neopentyl glycol ethylene oxide 2 mol adduct), propoxylated (2) neopentyl glycol di(meth)acrylate (a compound formed by di(meth)acrylating neopentyl glycol propylene oxide 2 mol adduct), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, tetramethylolmethane tri(meth)acrylate, dimethyloltricyclodecane di(meth)acrylate, modified glycerol tri(meth)acrylate, modified bisphenol A di(meth)acrylate, bisphenol A propylene oxide (PO) adduct di(meth)acrylate, bisphenol A ethylene oxide (E0) adduct di(meth)acrylate, dipentaerythritol hexa(meth)acrylate, and caprolactone-modified dipentaerythritol hexa(meth)acrylate.

<Oligomer>

The ink composition of the present invention preferably comprises also an oligomer.

The 'oligomer' referred to here is usually a polymer having a limited number (usually 5 to 100) of monomer-based constituent units, and the weight-average molecular weight is preferably 400 to 10,000, and more preferably 500 to 5,000.

Preferable examples of the oligomer comprise (meth)acryloyl group as functional group.

From the viewpoint of a balance of flexibility and curability, number of the functional group comprised in oligomer is preferably 1 to 15 per molecule, more preferably 2 to 6, yet more preferably 2 to 4, and particularly preferably 2.

As the oligomer in the present invention, polyester(meth)acrylate, an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, a (meth)acrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylamine, etc.), an addition-polymerization type oligomer (an oligoester (meth)acrylate, a polyamide oligomer, a polyisocyanate oligomer), an addition-condensation oligomer (a phenolic resin, an amino resin, a xylene resin, a ketone resin, etc.), and an amino modifier polyester oligomer may be cited. Among them an oligoester (meth)acrylate is preferable, and among them a urethane acrylate, oligomer and a polyester (meth)acrylate oligomer are more preferable, and a urethane (meth)acrylate oligomer is particularly preferable to obtain an ink composition having excellent adhesion and curability.

The ink composition of the present invention preferably comprises, as an oligomer, an amine oligomer such as an amino modifier oligomer, an amino modifier polyester oligomer, and an amino modifier acrylate oligomer. The molecular weight of the amine oligomer is preferably 300 to 1,500.

The oligomer, one type thereof may be used on its own, or two or more types thereof may be used in combination.

As the urethane (meth)acrylate, an aliphatic urethane (meth)acrylate and an aromatic urethane (meth)acrylate may preferably be cited, and an aliphatic urethane (meth)acrylate may more preferably be cited.

With respect to the oligomer, 'Origomar Handobukku (Oligomer Handbook)' (edited by Junji Furukawa, The Chemical Daily Co., Ltd.) may also be referred to.

Examples of the urethane (meth)acrylate oligomer include U-2PPA, U-4HA, U-6HA, U-6LPA, U-15HA, U-324A, UA-122P, UA5201, and UA-512 manufactured by Shin-Nakamura Chemical Co., Ltd., CN964A85, CN964, CN959, CN962, CN963J85, CN965, CN982B88, CN981, CN983, CN996, CN9002, CN9007, CN9009, CN9010, CN9011, CN9178, CN9788, and CN9893 manufactured by Sartomer Company Inc., and EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, and EB8800-20R manufactured by Daicel-Cytec Company Ltd.

Examples of the amine-modified polyester oligomer include EB524, EB80, and EB81 manufactured by Daicel-Cytec Company Ltd., CN550, CN501, and CN551 manufactured by Sartomer Company Inc., and GENOMER 5275 of Rahn A.G.

From the viewpoint of a balance being achieved between curability and adhesion, the content of the oligomer is preferably 0.1 to 10 wt % relative to the total weight of the ink composition, more preferably 0.5 to 8 wt %, and yet more preferably 1 to 6 wt %.

From the viewpoint of curability, the content of the polyfunctional (meth)acrylate compound, including the oligomer, is preferably 1 to 30 wt % relative to the total weight of the ink composition, more preferably 2 to 25 wt %, yet more preferably 3 to 20 wt %, and particularly preferably 6 to 10 wt %.

<Vinyl Ether Compound>

Furthermore, as the polymerizable compound, it is preferable to use a vinyl ether compound. The vinyl ether compound can be roughly divided into monovinyl ether compound and di- or tri-vinyl ether compound.

Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, isopropenyl vinyl ether, dodecyl vinyl ether, and diethylene glycol monovinyl ether.

Among these vinyl ether compounds, divinyl ether compounds and trivinyl ether compounds are preferable from the viewpoint of curability, adhesion, and surface hardness, and divinyl ether compounds are particularly preferable. The vinyl ether compound may be used singly or in a combination of two or more types as appropriate.

The content of Component E is preferably 40 to 95 wt % relative to the total weight of the ink composition, more preferably 50 to 90 wt %, and yet more preferably 60 to 85 wt %.

(Component F) Colorant

In the present invention, the ink composition may preferably contain (Component F) a colorant in order to improve the visibility of a formed image area.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include C. I. Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C. I. Disperse Green 6:1 and 9.

The colorant is preferably added to the ink composition and then dispersed in the ink composition to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

In the preparation of an ink composition, the colorant may be added directly to the ink composition together with other components. Furthermore, in order to improve dispersibility it may be added in advance to a solvent or a dispersing medium such as a polymerizable compound used in the present invention, homogeneously dispersed or dissolved, and then added to the ink composition.

In the present invention, in order to avoid the problem of the solvent resistance being degraded when the solvent remains in the cured image and the VOC (Volatile Organic Compound) problem of the residual solvent, it is preferable to add in advance the colorant to the dispersing medium such as the polymerizable compound. As a polymerizable compound used as the dispersing medium of the colorant, it is preferable in terms of dispersion suitability to select a monomer having the lowest viscosity. The colorants may be used by appropriately selecting one type or two or more types thereof according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. It is preferable for the colorant to control its particle size, since clogging of a head nozzle can be suppressed and the storage stability, transparency, and curing sensitivity of the ink composition can be maintained.

The content of the colorant in the ink composition is appropriately selected according to the color and the intended purpose, and is preferably 0.01 to 30 wt % relative to the weight of the entire ink composition.

(Component G) Dispersant

The ink composition of the present invention preferably comprises a dispersant. In particular, when the pigment is used, the ink composition preferably comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is preferably 0.05 to 15 wt % relative to the weight of the entire ink composition.

(Component H) Surfactant

The ink composition of the present invention may have a surfactant added for imparting stable discharge properties over a long period of time.

From the viewpoint of surface gloss and suppressing stripe unevenness, the ink composition of the present invention preferably either does not comprise a silicone-based surfactant or a fluorine-based surfactant or comprises a silicone-based surfactant and a fluorine-based surfactant at a total content of greater than 0 wt % but no greater than 0.01 wt % relative to the entire weight of the ink composition, more preferably either does not comprise them or comprises them at greater than 0 wt % but no greater than 0.005 wt %, and particularly preferably does not comprise them.

As a surfactant other than silicone-based and fluorine-based surfactants, those described in JP-A-62-173463 and JP-A-62-183457 can be cited. Examples thereof include an anionic surfactant such as a dialkyl sulfosuccinate salt, an alkylnaphthalene sulfonic acid salt, or a fatty acid salt, a nonionic surfactant such as a polyoxyethylene alkyl ether, a polyoxyethylene alkyl allyl ether, an acetylene glycol, or a polyoxyethylene-polyoxypropylene block copolymer, and a cationic surfactant such as an alkylamine salt or a quaternary ammonium salt.

(Component I) Other Polymerization Initiator

The ink composition of the present invention may comprise a polymerization initiator other than Component A to Component C, but preferably comprises no polymerization initiator other than Component A to Component C.

The polymerization initiator in the present invention includes not only a compound that generates a polymerization-initiating species by absorbing external energy such as actinic radiation but also a compound that promotes decomposition of a polymerization initiator by absorbing specific actinic radiation (a so-called sensitizer).

Examples of the other polymerization initiator include an aromatic ketone, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon halogen bond.

As the other polymerization initiator, a known polymerization initiator other than Component A to Component C, preferably a radical polymerization initiator, may be used, and examples thereof include those described in paragraphs 0090 to 0116 of JP-A-2009-185186.

Furthermore, as the other polymerization initiator, a thiochromanone compound may be used, and examples include compounds described in paragraphs 0064 to 0068 of JP-A-2010-126644.

The ink composition of the present invention may employ a known sensitizer as the polymerization initiator other than Component A to Component C.

Examples of the sensitizer include a polynuclear aromatic compound (e.g. pyrene, perylene, triphenylene, 2-ethyl-9,10-dimethoxyanthracene, etc.), a xanthene (e.g. fluorescein, eosin, erythrosine, Rhodamine B, Rose Bengal, etc.), a cyanine (e.g. thiacarbocyanine, oxacarbocyanine, etc.), a merocyanine (e.g. merocyanine, carbomerocyanine, etc.), a thiazine (e.g. thionine, methylene blue, toluidine blue, etc.), an acridine (e.g. acridine orange, chloroflavine, acriflavine, etc.), an anthraquinone (e.g. anthraquinone, etc.), a squarium (e.g. squarium, etc.), and a coumarin (e.g. 7-diethylamino-4-methylcoumarin, etc.).

With regard to the sensitizer, one type thereof may be used on its own or two or more types may be used in combination.

Other Components

The ink composition of the present invention may comprise as necessary, in addition to the above-mentioned components, a co-sensitizer, a UV absorber, an antioxidant, an antifading agent, a conductive salt, a solvent, a polymer compound, a basic compound, a leveling additive, a matting agent and, for adjusting film physical properties, a polyester resin, a polyurethane resin, a vinyl resin, an acrylic resin, a rubber resin, or a wax, etc.

They are described in JP-A-2009-221416 and may be used in the present invention as well.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature (25° C.) is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 40 mN/m, and more preferably 23 to 39 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 40 mN/m.

(Inkjet Recording Method)

The inkjet recording method of the present invention comprises (a) a step of discharging onto a recording medium an ink composition constituting the ink set for inkjet recording of the present invention and (b) a step of curing the ink composition by irradiating the discharged ink composition with actinic radiation using a UV light-emitting diode.

<Step (a): Image Formation Step>

The image formation step of forming an image on a recording medium by discharging an ink composition of the present invention is first explained.

The recording medium used in the present invention is not particularly limited, and a known recording medium may be used. Examples thereof include paper, paper laminated with a plastic (e.g. polyethylene, polypropylene, polystyrene, etc.), a metal plate (e.g. aluminum, zinc, copper, etc.), a plastic film (e.g. polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium is preferable and among them a plastic film and a paper are more preferable.

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a support in step (a) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multi-size dot of preferably 1 to 100 µL, more preferably 3 to 42 µL, and yet more preferably 8 to 30 µL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

An inkjet head used in the inkjet recording method of the present invention is preferably an inkjet head having a non-liquid repellent-treated nozzle plate. As the nozzle plate, a known nozzle plate may be used and, for example, inkjet heads described in U.S. Pat. No. 7,011,396 or US Pat. Application No. 2009/0290000 may preferably be used. Such a nozzle plate is mounted in, for example, a piezo drive system on-demand inkjet head manufactured by FUJIFILM Dimatix, Inc. Specific examples thereof include the S-class and Q-class Sapphire.

The nozzle plate is preferably one in which at least part of a face on the side opposing a recording medium is treated so as to be non-liquid repellent (ink affinity treatment). As a non-liquid repellent treatment method, a known method may be used and examples thereof include, but are not limited to, (1) a method in which a silicon oxide film is formed by thermally oxidizing the surface of a nozzle plate made of silicon, (2) a method in which an oxide film of silicon or a material other than silicon is oxidatively formed or a method in which it is formed by sputtering, and (3) a method in which a metal film is formed. Details of these methods may be referred to in US Pat. Application No. 2010/0141709.

The inkjet head preferably has a productivity of at least 400 ng*kHz.

The productivity is calculated from weight per dot of the ink composition×number of nozzles×frequency, and means the weight of the ink composition that is discharged during one second.

Since the ink composition of the present invention has high curing sensitivity and can be cured in a short period of time, even if image formation equipment having a productivity of at least 400 ng*kHz is used, it is possible to form an image without degrading the image quality. The productivity is preferably 200 to 800 ng*kHz, and more preferably 300 to 600 ng*kHz.

In the present invention, since it is preferable for the ink composition to be discharged at a constant temperature, a preferably used image forming equipment has a section from the ink composition supply tank to the inkjet head can be thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

Since a radiation curing type ink composition such as the ink composition of the present invention generally has a higher viscosity than that of an aqueous ink composition usually used as an ink composition for inkjet recording, variation in the viscosity due to variation in temperature at the time of discharge is large. Variation in the viscosity of the ink composition greatly affects change in size of liquid droplets and change in discharge rate of liquid droplets, and consequently causes degradation of image quality. It is therefore preferable to maintain the temperature of the ink composition at the time of discharge as constant as possible. Therefore, the control range for the temperature of the ink composition is preferably ±5° C. of a set temperature, more preferably ±2° C. of the set temperature, and yet more preferably ±1° C. of the set temperature.

<Step (b)>

Step (b) of curing the ink composition by irradiating the discharged ink composition with actinic radiation using a UV light-emitting diode (hereinafter, also called a curing step) is now explained.

The ink composition discharged on a recording medium is cured by irradiation with UV. This is due to a polymerization initiator contained in the ink composition of the present invention being decomposed by irradiation with UV to thus generate a polymerization-initiating species such as a radical, and the initiating species functioning so as to cause and promote a polymerization reaction of a polymerizable compound. In this process, if a sensitizer is present together with the polymerization initiator in the ink composition, the sensitizer in the system absorbs UV, attains an excited state, and contacts the polymerization initiator to thus promote decomposition of the polymerization initiator, thereby achieving a higher sensitivity curing reaction.

In the curing step, as a radiation source for UV, a light-emitting diode (UV-LED) that emits UV having an emission peak wavelength in the range of 380 to 420 nm is preferably used.

As the UV-LED, for example, Nichia Corporation put on the market a violet LED for which the main emission spectrum has a wavelength between 365 nm and 420 nm. Furthermore, other ultraviolet LEDs are also available, and irradiation may be carried out with a different UV bandwidth.

The emission peak wavelength of UV used in the present invention depends on sensitizer absorption characteristics, but is preferably 380 to 420 nm. When it is at least 380 nm, the safety is excellent. When it is no greater than 420 nm, the curability is excellent, which is preferable. From the viewpoint of curability, the UV emission peak wavelength is preferably 380 to 410 nm, and more preferably 380 to 405 nm.

The ink composition used in the present invention has excellent curability toward UV having an emission peak at a longer wavelength than that of UV that has conventionally been used for curing.

Since the ink composition of the present invention has sufficient sensitivity, it is sufficiently cured even with low power actinic radiation. Specifically, it cures sufficiently when the maximum illumination intensity on a recording medium surface is in the range of preferably 10 to 2,000 mW/cm$^2$, more preferably 650 to 1,800 mW/cm$^2$, and yet more preferably 700 to 1,600 mW/cm$^2$.

The ink composition of the present invention is desirably exposed to such actinic radiation for preferably 0.01 to 2 sec., more preferably 0.1 to 1.5 sec., and yet more preferably 0.3 to 1 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system.

In this way, in accordance with the use of a small-size and light-weight UV-LED as an actinic radiation source provided in the operating part, it is possible to achieve small size and low energy inkjet recording equipment, thus enabling an image to be formed with high productivity. Moreover, since a UV-LED has excellent versatility with regard to exposure conditions, suitable exposure conditions may be set according to the ink composition, and an image can be formed with high productivity.

Irradiation with actinic radiation is carried out after a certain time (preferably 0.01 to 0.5 sec., more preferably 0.01 to 0.3 sec., and yet more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

In the curing step, the energy applied by the light-emitting diode, that is, the energy (integrated amount of light) applied to the ink composition on the recording medium by irradiation with UV, is preferably 100 to 1,000 mJ/cm$^2$, more preferably 150 to 800 mJ/cm$^2$, and yet more preferably 200 to 700 mJ/cm$^2$. It is preferable for it to be in the above-mentioned numerical range since a balance can be achieved between productivity and curability.

In the inkjet recording method of the present invention, it is also preferable to form at least part of an image in a printed material by repeating the image formation step (a) and the curing step (b) at least twice because an image having excellent surface gloss is obtained.

Examples of the mode in which at least part of an image in a printed material is formed by repeating the image formation step (a) and the curing step (b) at least twice include a mode in which a color image is formed by carrying out steps (a) and (b) above once per color, a mode in which a monochromatic image is formed by repeating steps (a) and (b) above twice or more for the monochromatic image, and a mode in which a color image is formed by repeating steps (a) and (b) above twice or more for one color of the color image to thus form a monochromatic image and by further repeating in the same manner steps (a) and (b) above twice or more for another color of the color image.

By employing the above-mentioned inkjet recording method, the dot diameter of the landed ink composition can be kept constant for various supports having different surface wettability, thus improving the image quality. In order to obtain a color image, it is preferable to superimpose in sequence from a low lightness color. By superimposing in sequence from an ink composition having low lightness, radiation can easily reach an ink composition in a lower part, and good curing sensitivity, reduction in residual monomer, and improvement of adhesion can be anticipated. With regard to irradiation, it is possible to carry out exposure of all colors at once after they are discharged, but from the viewpoint of promoting curing it is preferable to carry out exposure for each color.

The inkjet recording method of the present invention may suitably employ the ink set comprising at least one ink composition of the present invention. The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In this way, the ink composition of the present invention may be cured by irradiation with actinic radiation in high sensitivity and form an image on the surface of the support.

When using as an ink set comprising plurality of ink compositions having a different color, the ink set is not particularly limited as long as it is an ink set having two or more types of ink compositions in combination, the ink set comprising in combination at least one ink composition of the present invention and another ink composition of the present invention or an ink composition other than one of the present invention, and it is preferable for the ink set to comprise at least one ink composition of the present invention having a color selected from cyan, magenta, yellow, black, white, light magenta, and light cyan.

Furthermore, the ink set of the present invention may be suitably used in the inkjet recording method of the present invention.

In order to obtain a full color image using the ink composition of the present invention, it is preferable to use, as the ink set of the present invention, an ink set comprising at least four dark ink compositions of yellow, cyan, magenta, and black, it is more preferable to use an ink set comprising in combination five dark ink compositions of yellow, cyan, magenta, black, and white and at least one ink composition of the present invention, and it is yet more preferable to use an ink set comprising in combination five dark ink compositions of yellow, cyan, magenta, black, and white and two, that is, light cyan, and light magenta ink compositions.

The 'dark ink composition' referred to in the present invention means an ink composition for which the content of the colorant exceeds 1 wt % of the entire ink composition. The colorant is not particularly limited; a known colorant may be used, and examples thereof include a pigment and a disperse dye.

The ink set of the present invention may comprise at least one dark ink composition and at least one light ink composition. The dark ink composition and the light ink composition employ colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1. When the ratio is in the above-mentioned range, a vivid full color image with little feeling of grain can be obtained.

In accordance with the present invention, there can be provided an ink composition that has excellent surface curability, antiblocking properties, and storage stability and that can give a cured film having excellent adhesion to a polyvinyl chloride substrate and an image having high image quality, and an inkjet recording method and printed material using the ink composition.

EXAMPLES

The present invention is explained below more specifically by reference to Examples and Comparative Examples. However, the present invention should not be construed as being limited by these Examples. 'Parts' in the description below means 'parts by weight' unless otherwise specified.

Materials used in the present invention are as follows.
IRGALITE BLUE GLVO (cyan pigment, Ciba Specialty Chemicals)
CINQUASIA MAGENTA RT-355-D (magenta pigment, Ciba Specialty Chemicals)
NOVOPERM YELLOW H2G (yellow pigment, Clariant)
SPECIAL BLACK 250 (black pigment, Ciba Specialty Chemicals)
SOLSPERSE 32000 (dispersant, Noveon)
NVC: N-vinylcaprolactam (V-CAP, ISP)

EOEOEA: 2-(2-ethoxyethoxy)ethyl acrylate (SR256, Sartomer)
IBOA: isobornyl acrylate (SR506, Sartomer)
PEA: phenoxyethyl acrylate (SR339, Sartomer)
EOTMPTA: ethylene oxide-modified trimethylolpropane triacrylate (SR-454, Sartomer)
TMPTA: trimethylolpropane triacrylate (SR351, Sartomer)
CTFA: cyclic trimethylolpropane formal acrylate (SR531, Sartomer)
SR9003: propylene glycol-modified neopentyl glycol diacrylate (Sartomer)
CN964 A85: difunctional aliphatic urethane acrylate (containing 15 wt % tripropylene glycol diacrylate, Sartomer)
Irg819: bis(2,4,6-trimethylbenzoyl)phenylphosphine oxide (IRGACURE 819, Ciba Specialty Chemicals)
TPO: 2,4,6-trimethylbenzoyldiphenylphosphine oxide (LUCIRIN TPO, BASF)
Irg907: 2-[4-(methylthio)benzoyl]-2-(4-morpholinyl)propane (IRGACURE 907, Ciba Specialty Chemicals)
Irg379: 2-(dimethylamino)-2-[(4-methylphenyl)methyl]-1-[4-(4-morpholinyl)phenyl]-1-butanone (IRGACURE 379, Ciba Specialty Chemicals)
Irg369: 2-benzyl-2-dimethylamino-1-(4-morpholinophenyl)-1-butanone (IRGACURE 369, Ciba Specialty Chemicals)
DETX: 2,4-diethylthioxanthone (KAYACURE DETX, Nippon Kayaku Co., Ltd.)
ITX: isopropylthioxanthone (SPEEDCURE ITX, LAMBSON)
UV-12: tris(N-nitroso-N-phenylhydroxylamine) aluminum salt, Kroma Chem)
MEHQ: hydroquinone monomethyl ether (Wako Pure Chemical Industries, Ltd.)

Preparation of Yellow Mill Base Y1

300 parts by weight of NOVOPERM YELLOW H2G, 600 parts by weight of SR9003, and 100 parts by weight of SOLSPERSE 32000 were mixed by stirring, thus giving yellow mill base Y1. Preparation of yellow mill base Y1 was carried out by dispersing using a Motor Mill M50 disperser (Eiger Machinery, Inc.) with zirconia beads having a diameter of 0.65 mm at a peripheral speed of 9 m/s for 10 hours.

Preparation of Magenta Mill Base M1

300 parts by weight of CINQUASIA MAGENTA RT-355-D, 600 parts by weight of SR9003, and 100 parts by weight of SOLSPERSE 32000 were mixed by stirring, thus giving magenta mill base M1. Preparation of magenta mill base M1 was carried out by dispersing using a Motor Mill M50 disperser (Eiger Machinery, Inc.) with zirconia beads having a diameter of 0.65 mm at a peripheral speed of 9 m/s for 10 hours.

Preparation of Cyan Mill Base C1

300 parts by weight of IRGALITE BLUE GLVO, 600 parts by weight of SR9003, and 100 parts by weight of SOLSPERSE 32000 were mixed by stirring, thus giving cyan mill base C1. Preparation of cyan mill base C1 was carried out by dispersing using a Motor Mill M50 disperser (Eiger Machinery, Inc.) with zirconia beads having a diameter of 0.65 mm at a peripheral speed of 9 m/s for 4 hours.

Preparation of Black Mill Base K1

400 parts by weight of SPECIAL BLACK 250, 500 parts by weight of SR9003, and 100 parts by weight of SOLSPERSE 32000 were mixed by stirring, thus giving black mill base K1. Preparation of black mill base K1 was carried out by dispersing using a Motor Mill M50 disperser (Eiger Machinery, Inc.) with zirconia beads having a diameter of 0.65 mm at a peripheral speed of 9 m/s for 7 hours.

Examples 1 to 18 and Comparative Examples 1 to 9

Method for Preparing Ink Composition

The materials described in Table 1 to Table 3 were mixed by stirring, thus giving each of the ink compositions of Examples 1 to 18 and Comparative Examples 1 to 9.

The inkjet recording method and various evaluations described below were carried out using each of the ink compositions obtained above. Evaluation results are shown in Table 1 to Table 3 below.

Inkjet Recording Method

An ink composition thus obtained was fired as droplets onto a sheet made of PVC and irradiated by transporting under a UV light-emitting diode (UV-LED) beam to thus cure the ink, thereby giving a printed material. In the present Examples, discharge of the ink was carried out using inkjet recording equipment having a piezo type Q-class Sapphire QS-256/10 inkjet head (FUJIFILM Dimatix, Inc., number of nozzles 256, liquid droplet volume 10 pL, 50 kHz, ink affinity treatment: silicon oxide), and the light-emitting diode (UV-LED) for curing employed an NC4U134 manufactured by Nichia Corporation. The above LED outputs UV light having a wavelength of 385 nm from 1 chip; the illumination intensity on the surface was fixed at 0.8 W/cm$^2$ and the exposure intensity was adjusted so as to be 10 mJ/cm$^2$ by controlling the transport speed. In the present Examples, exposure was carried out about 0.5 seconds after landing.

Evaluation of Ink Composition

Evaluation of Surface Curability

Evaluation was carried out by the above-mentioned inkjet recording method. If printing were carried out under multipass conditions, dots with various exposure intensities would be present in a mixed state on the substrate according to the number of passes, and evaluation would not be possible: under the present evaluation conditions, droplets were fired from the head onto a substrate by unidirectional printing, exposure was carried out only once about 0.5 seconds after landing, and sensory evaluation of the state of cure of the substrate sample removed from the printer was carried out in accordance with the evaluation criteria below.

The surface curability was evaluated in accordance with the criteria below by lightly rubbing the dot surface using a cotton bud.

Excellent: the surface was completely cured, and no color was transferred to the cotton bud.
Good: the surface was almost cured, and hardly any color was transferred to the cotton bud.
Fair: the state of cure of the surface was rather insufficient, and there was obvious color transfer to the cotton bud.
Poor: the surface was tacky, and the ink was transferred to the cotton bud.

Evaluation of Adhesion to Polyvinyl Chloride (PVC) Substrate (Evaluation of Interior Curability)

Evaluation was carried out using the above-mentioned inkjet recording method. An ink composition thus obtained was fired as droplets onto a sheet made of PVC and irradiated by transporting under a UV light-emitting diode (UV-LED) beam to thus cure the ink, thereby giving a printed material. A solid image with a 100% fired droplet ratio by 8 passes was printed in a unidirectional print mode, and a print sample was formed under conditions such that the integrated exposure was 310 mJ/cm$^2$ by passing two LED exposure devices mounted at opposite ends of the head 31 times. Evaluation of the substrate adhesion was carried out using this print sample in accordance with ISO 2409 (cross-cut method) by the criteria below.

Excellent: there was hardly any effect on the edges of the cuts or the lattice cells, to the extent that nothing could be identified by the naked eye.

Good: the edges of the cuts were completely smooth, there was no peeling off or only slight peeling off in any lattice cell, and no greater than 10% of the cross-cut area was affected.

Fair: part or the whole of the coating peeled off along the edges of the cuts and/or various parts of the lattice cells were partially or completely peeled off. Greater than 10% but no greater than 35% of the cross-cut area was affected.

Poor: part or the whole of the coating was peeled off along the edges of the cuts and/or several lattice cells were partially or completely peeled off. Greater than 35% of the cross-cut area was affected.

Evaluation of Image Quality (Evaluation of Graininess and Color Change)

An overall evaluation of graininess and color change was carried out in accordance with the method below, and a sensory evaluation of image quality was carried out.

Evaluation of graininess was carried out by printing an image with gradations in the range of 0% to 100% using a printer and visually assessing the graininess in a halftone region. Evaluation of color change was carried out by printing two sheets of the same image with an interval of 20 minutes and visually assessing whether or not there was any color change.

Excellent: neither color change nor graininess was observed.

Good: color change and/or graininess were slightly visible but at a level that caused no problem in practice.

Fair: color change and/or graininess were visible at a level that caused a slight problem in practice.

Poor: color change and graininess were clear at a level that caused an obvious problem in practice.

Evaluation of Antiblocking Properties

Printing was carried out under the same conditions as those for evaluation of adhesion to a polyvinyl chloride substrate, a transparent PET substrate was superimposed on the printed surface, and evaluation was carried out by applying a load from above so as to give 0.02 kg/cm² for 24 hours.

Excellent: the print surface and the PET substrate had no trace of ink transfer.

Good: there was no trace of ink transfer on the print surface, and there was slight transfer of ink on the PET substrate but at a level that caused no problem in practice.

Fair: there was a trace of ink transfer on the print surface, and there was transfer of ink on the PET substrate at a level that caused a problem in practice.

Poor: there were clear traces of ink transfer on both the ink surface and the PET substrate at a level that caused a problem in practice.

Evaluation of Storage Stability of Ink Composition

Stability of an ink was evaluated by measuring ink viscosity and particle size. The storage stability of an ink composition was defined as the percentage change between liquid physical properties (viscosity and pigment particle size) immediately after an ink was prepared and liquid physical properties after 4 weeks at 60° C.

The percentage change of an ink was calculated in accordance with the equation below. The viscosity and the pigment particle size were calculated individually to thus give a percentage change of viscosity and a percentage change of particle size.

Percentage change ink (viscosity or pigment particle size)={(liquid physical properties (viscosity or pigment particle size) after 4 weeks at 60° C.)−(liquid physical properties (viscosity or pigment particle size) immediately after ink was prepared)}/liquid physical properties (viscosity or pigment particle size) immediately after ink was prepared Excellent: both change in ink viscosity and change in pigment particle size were less than 5%.

Good: both change in ink viscosity and change in pigment particle size were less than 10%.

Fair: change in ink viscosity and/or change in pigment particle size were at least 10% but less than 15%.

Poor: change in ink viscosity and/or change in pigment particle size were at least 15% at a level that caused a problem in practice.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Polymerizable compound | NVC | 22.74 | 22.74 | 22.74 | 20.09 | 26.09 | 16.09 | 24.46 | 24.59 | 24.59 |
| | EOEOEA | — | — | — | 6.00 | — | — | — | — | — |
| | IBOA | — | 35.45 | 5.00 | — | — | 7.40 | — | — | — |
| | PEA | 36.45 | — | 30.45 | 35.01 | 36.01 | 36.01 | 34.00 | 36.37 | 37.37 |
| | EOTMPTA | 7.21 | 7.21 | 7.21 | 5.00 | 5.00 | 5.00 | 7.49 | 7.49 | 7.49 |
| | TMPTA | — | — | — | — | — | — | — | — | — |
| | CTFA | 12.60 | 12.60 | 12.60 | 7.50 | 7.50 | 7.30 | 8.90 | 8.90 | 8.90 |
| Oligomer | CN964A85 | 4.00 | 4.00 | 4.00 | — | — | — | 4.00 | 4.00 | 4.00 |
| Polymerization initiator | Irg819 (Component A1) | 3.60 | 3.00 | — | 2.70 | 3.60 | 3.60 | 4.80 | 4.00 | 3.60 |
| | TPO (Component A2) | — | 1.00 | 3.60 | — | — | 2.00 | 1.50 | 0.60 | — |
| | Irg907 (Component B1) | 2.40 | 3.00 | 2.40 | 3.30 | 2.40 | 3.20 | 0.80 | 2.40 | 2.40 |
| | Irg379 (Component B2) | — | — | — | — | — | — | 2.40 | — | — |
| | Irg369 (Component B3) | — | — | — | — | — | — | — | — | — |
| | DETX (Component C) | 3.00 | 3.00 | — | 2.00 | 2.00 | 2.00 | — | 2.00 | 2.00 |
| | ITX (Component C) | — | — | 3.00 | 1.00 | — | — | 2.00 | — | — |
| | Mill base | Y1 | Y1 | Y1 | M1 | M1 | M1 | C1 | C1 | C1 |
| | | 7.00 | 7.00 | 7.00 | 16.40 | 16.40 | 16.40 | 8.65 | 8.65 | 8.65 |
| Additive | SOLSPERSE 32000 | — | — | — | — | — | — | — | — | — |
| Polymerization inhibitor | MEHQ | — | — | — | — | — | 1.00 | — | — | — |
| | ST-1 | — | — | 1.00 | — | — | — | — | — | — |
| | UV-12 | 1.00 | 1.00 | 1.00 | 1.00 | 1.00 | — | 1.00 | 1.00 | 1.00 |
| | Total (parts by weight) | 100.00 | 100.00 | 100.00 | 100.00 | 100.00 | 100.00 | 100.00 | 100.00 | 100.00 |
| | Ratio by weight ((A)/(B)) | 1.50 | 1.33 | 1.50 | 0.82 | 1.50 | 1.75 | 1.97 | 1.92 | 1.50 |

TABLE 1-continued

|  |  | Examples |  |  |  |  |  |  |  |  |
|---|---|---|---|---|---|---|---|---|---|---|
|  |  | 1 | 2 | 3 | 4 | 5 | 6 | 7 | 8 | 9 |
| Evaluation results | Surface curability | Exc. | Exc. | Good | Exc. | Exc. | Good | Good | Exc. | Exc. |
|  | PVC substrate adhesion | Exc. | Exc. | Exc. | Good | Exc. | Exc. | Exc. | Exc. | Exc. |
|  | Image quality | Exc. | Good | Good | Exc. | Exc. | Good | Good | Good | Exc. |
|  | Antiblocking properties | Exc. | Good | Exc. | Exc. | Exc. | Good | Good | Good | Exc. |
|  | Ink storage stability | Exc. | Exc. | Exc. | Exc. | Exc. | Exc. | Exc. | Exc. | Exc. |

TABLE 2

|  |  | Example |  |  |  |  |  |  |  |  |
|---|---|---|---|---|---|---|---|---|---|---|
|  |  | 10 | 11 | 12 | 13 | 14 | 15 | 16 | 17 | 18 |
| Polymerizable compound | NVC | 14.00 | 24.01 | 24.01 | 28.52 | 25.00 | 28.52 | 26.32 | 26.32 | 26.00 |
|  | EOEOEA | 20.00 | — | — | — | — | 17.50 | — | — | — |
|  | IBOA | — | — | 4.00 | — | 1.52 | — | — | — | — |
|  | PEA | 22.64 | 37.03 | 30.00 | 37.25 | 37.25 | 20.00 | 36.10 | 37.10 | 37.02 |
|  | EOTMPTA | 7.42 | 7.42 | 6.45 | — | — | — | — | — | — |
|  | TMPTA | — | — | — | 7.50 | 7.50 | 7.50 | 6.95 | 6.95 | 6.95 |
|  | CTFA | 8.60 | 8.60 | 11.10 | 12.85 | 12.85 | 12.60 | 12.85 | 12.85 | 12.85 |
| Oligomer | CN964A85 | 4.00 | 4.00 | 4.00 | 3.00 | 3.00 | 3.00 | 3.00 | 3.00 | 3.00 |
| Polymerization initiator | Irg819 (Component A1) | 0.30 | 3.60 | 3.60 | 3.60 | 3.60 | — | 4.00 | 3.60 | 3.00 |
|  | TPO (Component A2) | 4.00 | — | — | — | — | 4.00 | — | — | — |
|  | Irg907 (Component B1) | 4.30 | 2.40 | 2.40 | 2.40 | 1.40 | 2.00 | 3.00 | 2.40 | 3.40 |
|  | Irg379 (Component B2) | — | — | — | — | 1.00 | — | — | — | — |
|  | Irg369 (Component B3) | 0.80 | — | — | — | — | — | — | — | — |
|  | DETX (Component C) | 2.00 | 3.00 | 1.00 | 2.00 | 3.00 | 2.00 | 2.00 | 2.00 | 2.00 |
|  | ITX (Component C) | 1.00 | — | 2.00 | — | — | — | — | — | — |
|  | Mill base | K1 | K1 | K1 | C1 | C1 | C1 | M1 | M1 | M1 |
|  |  | 8.94 | 8.94 | 8.94 | 1.13 | 1.13 | 1.13 | 3.25 | 3.25 | 3.25 |
| Additive | SOLSPERSE 32000 | — | — | — | 0.75 | 0.75 | 0.75 | 1.53 | 1.53 | 1.53 |
| Polymerization inhibitor | MEHQ | 1.00 | — | 1.00 | — | — | — | — | — | — |
|  | ST-1 | 1.00 | — | 0.50 | — | 1.00 | — | — | — | — |
|  | UV-12 | — | 1.00 | 1.00 | 1.00 | 1.00 | 1.00 | 1.00 | 1.00 | 1.00 |
| Total (parts by weight) |  | 100.00 | 100.00 | 100.00 | 100.00 | 100.00 | 100.00 | 100.00 | 100.00 | 100.00 |
| Ratio by weight ((A)/(B)) |  | 0.84 | 1.50 | 1.50 | 1.50 | 1.50 | 2.00 | 1.33 | 1.50 | 0.88 |
| Evaluation results | Surface curability | Exc. | Exc. | Exc. | Exc. | Good | Exc. | Exc. | Exc. | Exc. |
|  | PVC substrate adhesion | Good | Exc. | Exc. | Exc. | Exc. | Exc. | Exc. | Exc. | Good |
|  | Image quality | Good | Exc. | Exc. | Exc. | Good | Good | Exc. | Exc. | Exc. |
|  | Antiblocking properties | Good | Exc. | Exc. | Exc. | Exc. | Exc. | Good | Exc. | Exc. |
|  | Ink storage stability | Exc. | Exc. | Exc. | Exc. | Exc. | Exc. | Exc. | Exc. | Exc. |

TABLE 3

|  |  | Comparative Example |  |  |  |  |  |  |  |  |
|---|---|---|---|---|---|---|---|---|---|---|
|  |  | 1 | 2 | 3 | 4 | 5 | 6 | 7 | 8 | 9 |
| Polymerizable compound | NVC | 22.74 | 22.74 | 22.74 | 22.74 | 22.74 | 22.74 | 22.74 | 22.74 | 22.74 |
|  | EOEOEA | — | — | — | — | — | — | — | — | — |
|  | IBOA | — | 38.95 | — | — | — | — | — | — | — |
|  | PEA | 35.95 | — | 30.45 | 34.65 | 39.45 | 32.45 | 36.45 | 37.45 | 27.45 |
|  | EOTMPTA | 7.21 | 7.21 | 7.21 | 7.21 | 7.21 | 7.21 | 7.21 | 7.21 | 7.21 |
|  | TMPTA | — | — | — | — | — | — | — | — | — |
|  | CTFA | 12.60 | 12.60 | 12.60 | 12.60 | 12.60 | 12.60 | 12.60 | 12.60 | 12.60 |
| Oligomer | CN964A85 | 4.00 | 4.00 | 4.00 | 4.00 | 4.00 | 4.00 | 4.00 | 4.00 | 4.00 |
| Polymerization initiator | Irg819 (Component A1) | 6.50 | 2.50 | 2.00 | 1.60 | 3.60 | 6.00 | 2.40 | 3.60 | 3.60 |
|  | TPO (Component A2) | — | — | 1.00 | — | — | — | — | — | — |
|  | Irg907 (Component B1) | — | 1.00 | 4.00 | 1.20 | 2.40 | 4.00 | 3.60 | 2.40 | 2.40 |
|  | Irg379 (Component B2) | — | — | — | — | — | — | — | — | — |
|  | Irg369 (Component B3) | — | — | — | — | — | — | — | — | — |
|  | DETX (Component C) | 3.00 | 3.00 | 8.00 | 8.00 | — | 3.00 | 3.00 | 3.00 | 3.00 |
|  | ITX (Component C) | — | — | — | — | — | — | — | — | — |
|  | Mill base | Y1 | Y1 | Y1 | Y1 | Y1 | Y1 | Y1 | Y1 | Y1 |
|  |  | 7.00 | 7.00 | 7.00 | 7.00 | 7.00 | 7.00 | 7.00 | 7.00 | 7.00 |
| Additive | SOLSPERSE 32000 | — | — | — | — | — | — | — | — | — |
| Polymerization | MEHQ | — | — | — | — | — | — | — | — | 5.00 |

TABLE 3-continued

| | | Comparative Example | | | | | | | | |
|---|---|---|---|---|---|---|---|---|---|---|
| | | 1 | 2 | 3 | 4 | 5 | 6 | 7 | 8 | 9 |
| zation inhibitor | ST-1 | — | — | — | — | — | — | — | — | — |
| | UV-12 | 1.00 | 1.00 | 1.00 | 1.00 | 1.00 | 1.00 | 1.00 | — | 5.00 |
| Total (parts by weight) | | 100.00 | 100.00 | 100.00 | 100.00 | 100.00 | 100.00 | 100.00 | 100.00 | 100.00 |
| Ratio by weight ((A)/(B)) | | — | 2.50 | 0.75 | 1.33 | 1.50 | 1.50 | 0.67 | 1.50 | 1.50 |
| Evaluation results | Surface curability | Poor | Poor | Good | Good | Poor | Good | Good | Exc. | Poor |
| | PVC substrate adhesion | Poor | Poor | Poor | Poor | Poor | Good | Poor | Exc. | Poor |
| | Image quality | Good | Poor | Poor | Poor | Poor | Good | Fair | Exc. | Poor |
| | Antiblocking properties | Poor | Poor | Poor | Poor | Poor | Poor | Good | Exc. | Poor |
| | Ink storage stability | Good | Exc. | Good | Good | Good | Good | Good | Poor | Exc. |

The units for the amount used of each compound in Table 1 to Table 3 are expressed as parts by weight.

What is claimed is:

1. An ink composition comprising:
(Component A) at least one compound selected from the group consisting of (Component A1) bis(2,4,6-trimethylbenzoyl)phenylphosphine oxide and (Component A2) 2,4,6-trimethylbenzoyldiphenylphosphine oxide;
(Component B) at least one compound selected from the group consisting of (Component B1) 2-methyl-1-(4-methylthiophenyl)-2-morpholinopropan-1-one, (Component B2) 2-(dimethylamino)-2-[(4-methylphenyl)methyl]-1-[4-(4-morpholinyl)phenyl]-1-butanone, and (Component B3) 2-benzyl-2-dimethylamino-1-(4-morpholinophenyl)-1-butanone;
(Component C) a thioxanthone compound;
(Component D) a polymerization inhibitor; and
(Component E) a polymerizable compound,
Component C having a content of 0.01 to 5 wt % relative to the total weight of the ink composition,
Component D having a content of 0.01 to 5 wt % relative to the total weight of the ink composition,
the sum of the content of Component A and the content of Component B being 6.0 to 9.5 wt % relative to the total weight of the ink composition, and
the ratio by weight ((A)/(B)) of the content (A) of Component A and the content (B) of Component B being 0.8 to 2.0,
wherein Component E comprises N-vinylcaprolactam, and the content of N-vinylcaprolactam is 14.00 to 28.52 wt % relative to the total weight of the ink composition.

2. The ink composition according to claim 1, wherein it is a UV-curable inkjet ink composition.

3. The ink composition according to claim 1, wherein Component C is diethylthioxanthone or 2-isopropylthioxanthone.

4. The ink composition according to claim 1, wherein it further comprises (Component F) a colorant.

5. The ink composition according to claim 4, wherein Component F is a pigment.

6. The ink composition according to claim 1, wherein Component A is Component A1.

7. The ink composition according to claim 1, wherein Component B is Component B1.

8. The ink composition according to claim 1, wherein Component A is Component A1 and Component B is Component B1.

9. The ink composition according to claim 1, wherein Component E comprises cyclic trimethylolpropane formal acrylate.

10. The ink composition according to claim 9 wherein the content of cyclic trimethylolpropane formal acrylate is 3 to 20 wt % relative to the total weight of the ink composition.

11. The ink composition according to claim 1, wherein Component E comprises an ethylene oxide-modified trimethylolpropane triacrylate and/or trimethylolpropane triacrylate.

12. The ink composition according to claim 1, wherein Component E comprises an ethylene oxide-modified trimethylolpropane triacrylate.

13. The ink composition according to claim 1, wherein Component E comprises cyclic trimethylolpropane formal acrylate and an ethylene oxide-modified trimethylolpropane triacrylate.

14. The ink composition according to claim 1, wherein Component E comprises phenoxyethyl acrylate.

15. The ink composition according claim 14, wherein the content of phenoxyethyl acrylate is 20 to 45 wt % relative to the total weight of the ink composition.

16. The ink composition according to claim 1, wherein Component E comprises an oligomer.

17. The ink composition according to claim 16, wherein the oligomer is a urethane (meth)acrylate oligomer.

18. An inkjet recording method comprising:
a step of discharging the ink composition according to claim 1 onto a recording medium; and
a step of curing the ink composition by irradiating the discharged ink composition with actinic radiation using a UV light-emitting diode.

19. The inkjet recording method according to claim 18, wherein the UV light-emitting diode has an emission peak wavelength in the range of 350 to 420 nm and has a maximum illumination intensity on the recording medium surface of 10 to 2,000 mW/cm$^2$.

20. The ink composition according to claim 1, wherein Component E comprises phenoxyethyl acrylate and cyclic trimethylolpropane formal acrylate,
the content of cyclic trimethylolpropane formal acrylate is 3 to 20 wt % relative to the total weight of the ink composition, and
the content of phenoxyethyl acrylate is 20 to 45 wt % relative to the total weight of the ink composition.

* * * * *